United States Patent [19]

Watabe et al.

[11] 4,426,459

[45] Jan. 17, 1984

[54] PROCESS FOR DECOMPOSING VULCANIZED RUBBER

[75] Inventors: Yoji Watabe, Hachiohji; Hideo Takeichi; Koichi Irako, both of Higashi Murayama, all of Japan

[73] Assignee: Bridgestone Tire Co., Ltd., Tokyo, Japan

[21] Appl. No.: 235,521

[22] Filed: Feb. 18, 1981

[30] Foreign Application Priority Data

Feb. 25, 1980 [JP] Japan ................................. 55-21587

[51] Int. Cl.³ .............................................. C08J 11/04
[52] U.S. Cl. ................................... 521/42; 521/42.5; 521/44; 521/44.5; 585/241
[58] Field of Search .................. 260/2.3, 713, 44, 712; 585/241; 521/42, 42.5, 43.5, 44.5, 45.5

[56] References Cited

U.S. PATENT DOCUMENTS

| 3,700,615 | 10/1972 | Scott | 521/43.5 |
| 4,051,080 | 9/1977 | Boccoli | 260/2.3 |
| 4,161,464 | 7/1979 | Nicholas | 260/2.3 |
| 4,177,079 | 12/1979 | Espenscheid | 260/2.3 |
| 4,211,676 | 7/1980 | Watabe et al. | 260/2.3 |

*Primary Examiner*—Allan Lieberman
*Attorney, Agent, or Firm*—Brooks, Haidt, Haffner & Delahunty

[57] ABSTRACT

A process for decomposing vulcanized rubber which comprises swelling 100 parts by weight of vulcanized rubber with 10–3000 parts by weight of an organic solution, and adding and mixing 0.1–20 parts by weight of an organic hydroperoxide (a) and of 0.001–1 mole equivalent per said (a) of at least one member (b) selected from the group consisting of copper salts, cobalt salts, and strongly alkaline compounds.

5 Claims, No Drawings

PROCESS FOR DECOMPOSING VULCANIZED RUBBER

BACKGROUND OF THE INVENTION

1. Field of the Invention

The present invention relates to a process for producing an industrially useful decomposed rubber in the form of a liquid to a half solid state by treating vulcanized rubber with peroxide.

2. Description of the Prior Art

As a result of recent remarkable development of motorization, the amount of used tires has increased rapidly and its treatment has become a big problem. Heretofore, used tires have been used for filling-up, the structural shape itself has been used or they have been simply burned. However, these treatments are not desired from viewpoint of prevention of environmental pollution and effective use of material sources.

For the purpose of fulfilling the above-mentioned demands, reclamation of used tires has been carried out for a long time. Studies on reclaiming used vulcanized rubber has recently become active, and various new processes and agents for reclaiming have been proposed in succession.

A thermal decomposition process which is recently noted is one of treatments for used tires. In this process, used tires are thermally decomposed at a high temperature between 400° C. and 900° C. by a dry distillation method which is carried out under anaerobic conditions on a partial combustion method to yield gas, oil and solid residues. The resulting gas and oil are used for fuel and the resulting solid residue is used for carbon material.

There has been recently proposed a process in which vulcanized rubber is mixed with oils and decomposed at lower temperature than that of the above-mentioned process, namely, at 210°–400° C. in an autoclave or screw extruder to produce a molten product of vulcanized rubber. However, these processes require a higher temperature than 200° C. to decompose vulcanized rubber. Therefore, it is desirable that a reclaiming process which is carried out at lower temperature, with less consumption of energy at a reduced cost is developed.

As a result of researching a process for chemically decomposing vulcanized rubber from the above-mentioned standpoint, the present inventors found a process in which vulcanized rubber can be effectively decomposed by use of diacyl peroxides at relatively low temperatures of 100° C. or below, and applied said process (U.S. patent application Ser. No. 185,672). As a result of further research on a more efficient system of decomposing vulcanized rubber, the present inventors found that a peroxide system comprising an organic hydroperoxide and a particular compound is efficient for decomposing vulcanized rubber.

Although a few papers have been reported on reactions of peroxides with unvulcanized rubber and decomposition of unvulcanized rubber with peroxides, there have not been any reports on decomposition of vulcanized rubber with peroxides. It is surprising that vulcanized rubber can be easily decomposed with particular peroxides under mild reaction conditions.

SUMMARY OF THE INVENTION

According to the present invention, there is provided a process for decomposing vulcanized rubber which comprises swelling 100 parts by weight of vulcanized rubber with 10–3000 parts by weight of an organic solvent, and addition and mixing of 0.1–20 parts by weight of an organic hydroperoxide (a) and of 0.001–1 mole equivalent per the (a) component of at least one member (b) selected from the group consisting of copper salts, cobalt salts and strongly alkaline compounds.

It is an object of the present invention to provide a process for producing decomposition products in a liquid to half solid state or solutions of decomposed rubber which are useful for industry by controlling the decomposition degree.

It is another object of the present invention to provide a process for decomposing vulcanized rubber which does not always require apparatuses for heating since the decomposition reaction proceeds at relatively low temperatures.

DESCRIPTION OF THE PREFERRED EMBODIMENTS

Vulcanized rubbers which can be decomposed by the process of the present invention are not only tire rubber for trucks and a buses in which natural rubber is mainly used, but also tire rubber for passenger cars and used rubbers such as rubber belts, rubber hoses, rubber sheets, rubber packings, and the like which are mainly made of synthetic rubber. Of course, scrap rubbers which are by-produced on molding or forming the above-mentioned articles can be used in the process of the present invention. These articles are made by a process in which sulfur, carbon black and other compounding ingredients are compounded with raw rubber, and then the resulting compound is vulcanized. However, unvulcanized rubber which has been compounded can be also used in the process of the present invention. Also, the process of the present invention can be applied to rubber cured with peroxides. Among them, rubber compounded with carbon black is preferable. It is not always necessary that the vulcanized rubber be in the form of powder. The vulcanized rubber may be in the form of a block or cut piece as far as the size is suitable for decomposition reactors.

Examples of the organic hydroperoxides which can be used in the present invention: tert-butylhydroperoxide, cumene hydroperoxide, diisopropylbenzene hydroperoxide, p-menthane hydroperoxide, 2,5-dimethylhexane-2,5-dihydroperoxide, methylhydroperoxide, ethylhydroperoxide, isopropylhydroperoxide, n-butylhydroperoxide, sec-butylhydroperoxide, cyclohexylhydroperoxide, cyclohexenehydroperoxide, and the like. Among them, tert-butyl hydroperoxide cumene hydroperoxide, diisopropylbenzene hydroperoxide, p-menthane hydroperoxide, and 2,5-dimethylhexane-2,5-dihydroperoxide are preferably used.

The organic hydroperoxide which is the foregoing (a) component is used in an amount of 0.1–20 parts by weight, preferably 1–5 parts by weight, per 100 parts by weight of vulcanized rubber. When the hydroperoxide is used in an amount less than 0.1 parts by weight, vulcanized rubber can not be fully decomposed. Also, for reasons of economy, it is not desirable that the hydroperoxide is used in an amount more than 20 parts by weight.

The (b) component used in the present invention is at least one member selected from the group consisting of copper salts, cobalt salts, and strongly alkaline compounds. Examples of the foregoing copper salts are: cuprous chloride, cupric chloride, cuprous bromide, cupric bromide, cuprous iodide, cuprous oxide, cupric oxide, copper carbonate, copper naphthenate, copper octenate, copper stearate, copper acetylacetone, copper dimethyl glyoxime, copper benzoate, copper ethyl acetoacetate, and the like. Among them, cuprous chloride and cupric chloride are preferably used.

Examples of the foregoing cobalt salts are: cobalt naphthenate, cobalt octanate, cobalt stearate, cobalt benzoate, cobalt acetate, cobalt acetylacetone, cobalt ethyl acetoacetate, cobalt dimethyl glyoxime, cobalt chloride, cobalt bromide, pyridine complexes thereof, and the like. Among them, cobalt naphthenate, cobalt octanate, and cobalt stearate are preferably used. Examples of the strongly alkaline compounds are: lithium hydroxide, sodium hydroxide, potassium hydroxide, 1,8-diazabicyclo[5,4,0]-undecene-7, and phenolates, hexanoates, and oleates of the foregoing compounds, and the like.

The foregoing (b) component is used in an amount in the range between 0.001-1 mole equivalent, preferably 0.01-0.5 mole equivalent, based on the (a) component.

In the present invention, it is desirable that a solvent capable of swelling vulcanized rubber is used.

Examples of the solvents are: halogenated hydrocarbons such as carbon tetrachloride, chloroform, dichloromethane, tetrachloroethylene, trichloroethylene, dichloroethylene, chlorobenzene, and the like; aromatic hydrocarbons such as benzene, toluene, xylene, and the like; aliphatic or cycloaliphatic hydrocarbons such as pentane, hexane, heptane, octane, cyclohexane and the like; methyl ethyl ketone, methyl butyl ketone, and the like. Among them, halogenated hydrocarbons such as carbon tetrachloride, chloroform, dichloromethane, tetrachloroethylene, trichloroethylene, dichloroethylene, chlorobenzenes, and the like are especially preferable.

The solvent is used in an amount of 10-3000 parts by weight, preferably 100-1500 parts by weight, per 100 parts by weight of vulcanized rubber. When the solvent is used in an amount less than 10 parts by weight, the decomposition of vulcanized rubber proceeds with difficulty. On the contrary, when the solvent is used in an amount more than 3000 parts by weight, the decomposition of vulcanized rubber proceeds easily, but the resulting solution of decomposed vulcanized rubber becomes dilute. This is undesirable.

For carrying out the decomposition reaction of vulcanized rubber, an apparatus such as an autoclave having a stirrer is preferably used. Since the decomposition reaction of vulcanized rubber according to the present invention is presumed to be an oxidative decomposition reaction, the decomposition is advantageously accelerated by a supply of air or oxygen. A stirrer is desirable.

The reaction can be carried out at temperatures between 0° C. and 100° C. The reaction becomes slower at lower temperature than 0° C. On the contrary, it is unsafe that the reaction may be carried out at temperatures beyond 100° C., because of the solvents used in the reaction system. It is not desirable that the reaction be carried out at temperatures other than 0° C.-100° C.

The decomposed vulcanized rubber according to the present invention has various uses. For example, a solution of the decomposed vulcanized rubber after completion of the reaction may be used for adhesives without evaporation of a solvent used in the reaction. By evaporation of the solvent, rubber in a form of a liquid or half solid state is obtained. Consequently, the products may be used for process oils, softeners, compounding ingredients for rubber such as fillers, modifiers for asphalt to be used in pavement, waterproof sheets, adhesive tapes, sealers, calking compounds, and sealing materials.

The following examples will serve to further illustrate the present invention. The decomposition degree mentioned in the following examples was defined by the passing degree of vulcanized rubber in a diluted solution on passing through wire cloth of 200 mesh, said diluted solution being obtained by dilution of a solution obtained from completing the reaction with tetrahydrofuran for several times. The passing degree was determined on the basis of rubber in which oils and rubber ingredients are removed by soaking vulcanized rubber to be treated in tetrahydrofuran.

EXAMPLES 1-2, COMPARATIVE EXAMPLES 1-7

In an Erlenmeyer flask were placed 100 parts by weight of rubber powder (natural rubber 50% and styrene-butadiene rubber 50%, and 50% of carbon black based on the total amount of the natural rubber and styrene-butadiene rubber) which was obtained from used tire rubber for passenger cars and the particle size thereof was 32-60 mesh. To 100 g. of the above-mentioned rubber powder was added 750 parts by weight of chloroform solution containing 19.3 parts by weight (0.173 mol) of tert-butylhydroperoxide of (a) component and any (b) component (0.043 mol). After the addition, the mixture was slowly stirred at 35°-40° C. without a stopper on the flask so that the mixture was always kept in contact with fresh air. In Examples 1 and 2, the decomposition reaction immediately started, and the mixture became black. After the reaction for 6 hours, the resulting mixture was passed through a wire cloth of 200 mesh, and the decomposition degree was determined. The obtained results are shown in Table 1.

TABLE 1

| Comparative Example or Example | Type of (b) Component | Decomposition Degree (%) |
|---|---|---|
| Comparative Example 1 | None | 9 |
| Comparative Example 2 | N—phenyl-N—isopropyl p-phenylenediamine | 1 |
| Comparative Example 3 | phenyl hydrazine | 11 |
| Comparative Example 4 | 2-amino-pyridine | 40 |
| Comparative Example 5 | N, N—dimethylaniline | 12 |
| Comparative Example 6 | triphenyl-phosphine | 5 |
| Comparative Example 7 | thiophenol | 8 |
| Example 1 | 1,8-diazabicyclo [5, 4, 0]-undecene-7 | 96 |
| Example 2 | potassium hydroxide | 85 |

Table 1 shows that the decomposition degree of vulcanized rubber is remarkably low in the presence of the (a) component only (Comparative Example 1) or in case that the (a) component is not combined with the strongly alkaline compound which is the (b) component according to the present invention, but with a compound other than the (b) component of the present invention. Though some of the components (Comparison Examples 2-5) are alkali, they are not effective.

EXAMPLES 3-6, COMPARATIVE EXAMPLES 8-12

In the same manner as described in Examples 1-2, vulcanized rubber was decomposed with a mixture of m mol of tert-butylhydroperoxide and 0.3 m mol of a compound listed in Table 2. The obtained results are shown in the Table.

TABLE 2

| Comparative Example or Example | Type of (b) Component | Decomposition Degree (%) |
| --- | --- | --- |
| Example 3 | cuprous chloride | 100 |
| Example 4 | cupric chloride.2 hydrate | 100 |
| Example 5 | cobalt naphthoic carboxylate | 97 |
| Example 6 | cobalt stearate | 95 |
| Comparative Example 8 | iron stearate | 29 |
| Comparative Example 9 | ferric chloride.6 hydrate | 29 |
| Comparative Example 10 | iron phthalocyanine | 63 |
| Comparative Example 11 | ferric chloride | 21 |
| Comparative Example 12 | titanium naphthoic carboxylate | 2 |

Table 2 shows that vulcanized rubber is decomposed in a substantially quantitative yield in a system in which copper salt or cobalt salt is used.

On the contrary, the decomposition degree of vulcanized rubber is remarkably low in a system outside the scope of the present invention in which iron salt or titanium salt is used.

Partly decomposed rubber was obtained by removing the solvent from the resulting solution in Examples 3 and 4. It was found by analysis that the partly decomposed rubber has molecular weight of about 15,000.

What we claim is:

1. A process for decomposing particles of compounded rubber which comprises swelling 100 parts by weight of the particulate rubber with 10-3000 parts by weight of an organic solvent for vulcanized rubber, and adding and mixing 0.1-20 parts by weight of an organic hydroperoxide (a) and 0.001-1 mol equivalent per said (a) of at least one strongly alkaline compound (b) selected from the group consisting of lithium hydroxide, sodium hydroxide, potassium hydroxide, and 1,8-diazabicyclo[5,4,0] undecene-7 and salts thereof, the decomposition being carried out at from 0° to 100° C.

2. A process for decomposing compounded rubber according to claim 1 in which said organic hydroperoxide is a member selected from the group consisting of tert-butylhydroperoxide, cumene hydroperoxide, diisopropylbenzene hydroperoxide, p-menthane hydroperoxide, and 2,5-dimethylhexane-2,5-dihydroperoxide.

3. A process for decomposing compounded rubber according to claim 1 in which said (a) component is used in an amount in the range between 1-5 parts by weight per 100 parts by weight of compounded rubber.

4. A process for decomposing compounded rubber according to claim 1 in which said (b) component is used in an amount in the range between 0.01-0.5 mole equivalent per said (a) component.

5. A process for decomposing compounded rubber according to claim 1 in which said organic solvent is at least one halogenated hydrocarbon.

* * * * *